Sept. 15, 1925.  
F. D. COOLEY  
PNEUMATIC HAMMER  
Filed April 28, 1922  
1,553,598  
2 Sheets-Sheet 1
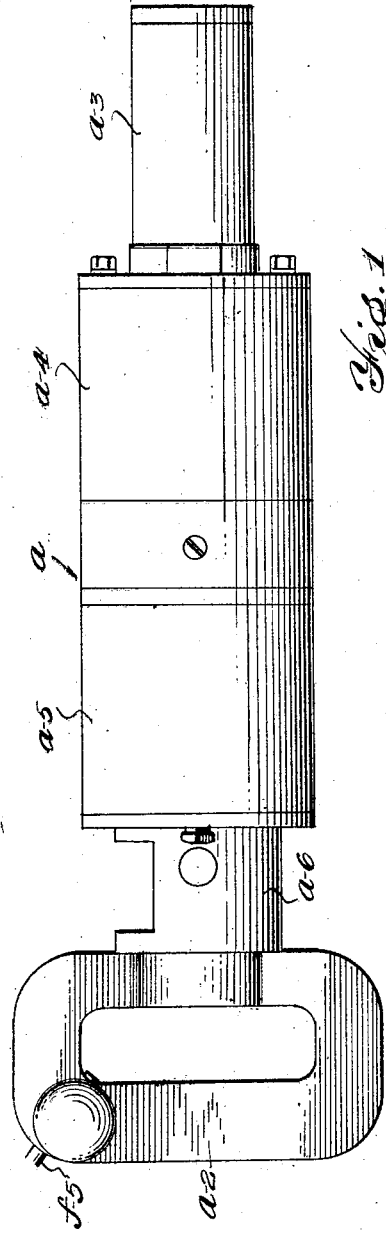
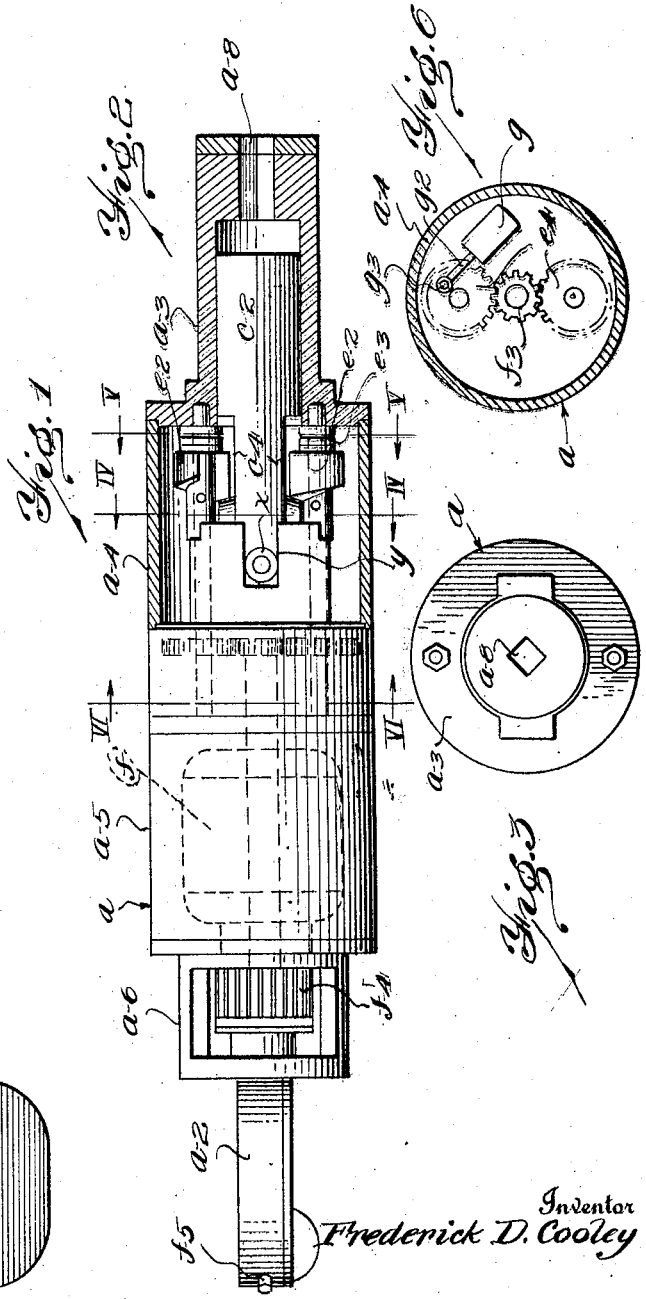
Inventor  
Frederick D. Cooley  
By Ralzemond A. Parker  
Attorney Sept. 15, 1925.  
F. D. COOLEY  
1,553,598  
PNEUMATIC HAMMER.  
Filed April 28, 1922  2 Sheets-Sheet 2

Inventor  
Frederick D. Cooley.  
By Ralzemond A. Parker  
Attorney

Patented Sept. 15, 1925.

1,553,598

UNITED STATES PATENT OFFICE.

FREDERICK D. COOLEY, OF DETROIT, MICHIGAN.

PNEUMATIC HAMMER.

Application filed April 28, 1922. Serial No. 557,151.

*To all whom it may concern:*

Be it known that I, FREDERICK D. COOLEY, citizen of the United States, residing at Detroit, county of Wayne, State of Michigan, have invented a certain new and useful Improvement in Pneumatic Hammers, and declare the following to be a full, clear, and exact description of the same, such as will enable others skilled in the art to which it pertains to make and use the same, reference being had to the accompanying drawings, which form a part of this specification.

My invention relates to automatic hammers and an object of my improvements is to provide a portable self-contained tool that shall be effective and convenient as an improved mechanical hammer.

I secure this object in the device illustrated in the accompanying drawings, in which:

Figure 1 is a side elevation of a portable tool involving my invention.

Fig. 2 is a plan view of the same partly in section.

Fig. 3 is a detailed end elevation looking from the right of Fig. 1.

Fig. 6 is a section on the line 6—6, Fig. 2.

$a$, $a$, $a$ indicates the casing, as a whole, of a mechanical hammer conveniently portable by means of a handle $a^2$. $a^3$ is a cylindrical portion of said casing of reduced diameter, having a co-axial aperture $a^8$ in its end for receiving the cutting tool upon which the hammer is designed to act. $a^4$ is a part of the casing $a$ in which the mechanism for applying the power is enclosed. $a^5$ is a co-axial portion of the casing of the same diameter as $a^4$, and forming an extension of the same, in which an electric motor is enclosed. $a^6$ is a co-axial part of the casing $a$ in which the commutator of the electric motor is contained and $a^2$ is the handle which is joined to the portion $a^6$ of said casing.

Figure 7:
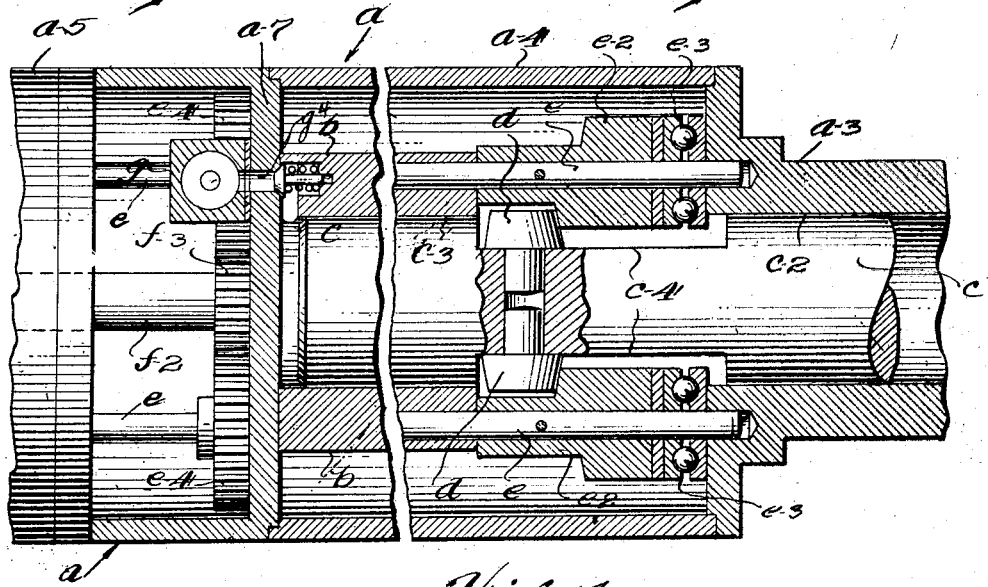
Fig. 7 is a detailed section to an enlarged scale, partly broken away to shorten the figure, the part at the left of the line indicating the break, being in a somewhat different plane to show the pump valve construction.

$a^7$ (Fig. 7) is a partition extending transversely across the interior of the casing $a$ between the portions $a^4$ and $a^5$ of said casing.

$b$ is a cylinder contained within the portion $a^4$ of the casing $a$, co-axial with said casing, having the partition $a^7$ closing one end, extending forward and having its other end open.

$c$ is a reciprocating plunger of cylindrical form at its ends fitting at $c^2$ into the bore $a^3$ of the casing $a$ and at $c^3$ fitting into the bore of the cylinder $c$. The plunger $c$ is cut away at opposite sides as indicated at $c^4$. $d$, $d$ are friction rollers extending laterally from the cut-away portions of the plunger $c$ upon opposite sides thereof.

$e$, $e$ are shafts parallel to the axis of the casing $a$ and plunger $c$ located upon opposite sides of said plunger. $e^2$, $e^2$ are cams upon the shafts $e$, $e$. These cams are provided with thrust bearings $e^3$, $e^3$ at their forward ends. The cams $e^2$ are adapted to engage the rollers $d$, $d$ to retract the plunger $c$ and force it into the cylinder $b$. Said cams are, therefore, provided with a face adapted to gradually act upon the rollers $d$, $d$ as the shafts $e$, $e$ are turned and are provided with steep (in this case, perpendicular) faces $e^5$ to permit the quick forward movement of the plunger $c$ to deliver the hammer blow. $e^4$, $e^4$ are gear wheels upon the ends of the shafts $e$, $e$ remote from the thrust bearings $e^3$, $e^3$.

$f$ is an electric motor, the armature of which is secured upon a shaft $f^2$ and is also provided with a commutator $f^4$ and the conventional brushes, not shown. $f^5$ is a switch device by which the current may be turned on to the motor $f$ or the circuit through said motor broken. $f^3$ is a gear wheel upon the inner end of the shaft $f^2$ of the motor $f$. This gear wheel has its teeth engaging the gear wheels $e^4$, $e^4$ on opposite sides.

$g$ is a small compressor communicating by means of a passage $g^4$, with a non-return valve therein, with a cylinder $b$ inside of the plunger $c$. The compressor $g$ is provided with a connecting rod $g^2$ (Fig. 6) which is eccentrically pivoted to the face of a gear wheel $g^4$ at $g^3$.

Figures 4, 5:
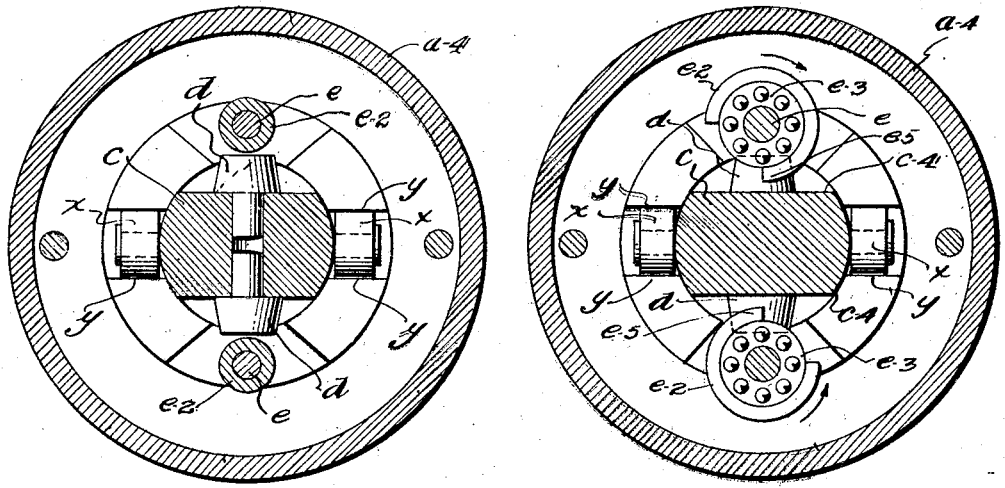
Fig. 4 is a section on the line 4—4, Fig. 2, to an enlarged scale.
Fig. 5 is a section on the line 5—5, Fig. 2, to an enlarged scale.

$x$, $x$, (Fig. 4) are friction rollers pivoted to and extending laterally from the plunger $c$ at points ninety degrees from the friction rollers $d$, $d$. The friction rollers $x$, $x$ reciprocate between guides $y$, $y$.

The casing $a$, $a$ with its handle $a^2$ has the conventional form of a pneumatic hammer.

The mode of operation of the above-described device is as follows:

An air pressure is maintained by the compressor $g$ in the cylinder $b$ between the closed end of said cylinder and the end $c^3$ of the plunger $c$.

To set the apparatus in motion the circuit through the electric motor is completed by manipulating the switch $f^5$. This energizes the motor which revolves the shaft $f^2$ and consequently the shafts $e$, $e$ through the gear wheels $f^3$ and $e^4$, $e^4$. The rotation of the shafts $e$, $e$ rotate the cams $e^2$, $e^2$ which act to retract the plunger $c$ against the pressure of the air in the cylinder $b$ until the steep faces $e^5$ of said cams pass the rollers $d$ when the plunger $c$ is forced forward by the pressure of the air in the cylinder $b$ and delivers the hammer blow. The rotation of the gear wheel $e^4$ actuates the compressor $g$ to maintain a pressure of air in the cylinder $b$.

It will be observed that this device is entirely self-contained. The air chamber is entirely enclosed and contained within the casing $a$ and the contained air under pressure is permanent, the compressor only serving to supply any leakage that may occur. It constitutes a tool that is easily transported and handled and may be used wherever a source of electrical power is available.

What I claim is:

1. In an apparatus of the kind described, the combination of a portable casing, a reciprocating part, a resilient means continuously acting to force said reciprocating part forward to deliver the hammer stroke, a motor carried by said frame, cams on opposite sides of said reciprocating part adapted to be rotated about axes parallel to the motion of said reciprocating part and adapted to engage said rotating part to retract and release said reciprocating part, and means whereby said motor rotates said cams for the purpose described.

2. In a self-contained hammer apparatus, the combination of a portable supporting casing, a reciprocating part, a resilient means continuously acting to force said reciprocating part forward to deliver the hammer stroke, a motor carried by said frame having a rotating part axially in line with said reciprocating part, cams on opposite sides of said reciprocating part adapted to be rotated about the axes parallel to the motion of said reciprocating part and adapted to engage said rotating part to retract and release the same, a gear wheel upon each of said cams and a gear wheel upon the rotating part of said motor located between the gear wheels connected with said cams and engaging the same.

3. In a hammer, the combination of a casing adapted to be carried in the hands of a workman, said casing including a cylinder closed at one end, a plunger fitting and adapted to reciprocate in said cylinder, a motor in said casing carried thereby, means in said casing and carried thereby actuated by said motor for maintaining air under pressure between said plunger and the closed end of said casing to force said plunger forward to deliver the hammer blow, said motor being adapted to retract said plunger and release the same, for the purpose described.

In testimony whereof, I sign this specification.

FREDERICK D. COOLEY.